United States Patent [19]
Raccio

[11] 3,757,616
[45] Sept. 11, 1973

[54] TOOL-HOLDER FOR MACHINE TOOLS

[76] Inventor: Joseph A. Raccio, Raccio Dr., Bethany, Conn.

[22] Filed: Oct. 27, 1971

[21] Appl. No.: 193,098

[52] U.S. Cl. ................................. 82/36 R, 29/78
[51] Int. Cl. ........................................ B23b 29/12
[58] Field of Search ...................... 82/36, 36 A, 37; 29/98

[56] References Cited
UNITED STATES PATENTS

| | | | |
|---|---|---|---|
| 2,875,662 | 3/1959 | Poorman | 82/36 |
| 2,466,596 | 4/1949 | Krause | 82/36 |
| 2,389,858 | 11/1945 | Kyle et al. | 82/36 |
| 3,043,173 | 7/1962 | Twamley et al. | 82/37 |
| 1,673,039 | 6/1928 | Brown | 29/98 |

Primary Examiner—Leonidas Vlachos
Attorney—Merrill F. Steward et al.

[57] ABSTRACT

A tool-holder for machine tools, such as engine lathes and screw machines having cross-slides by which cutting tools are moved into and out of engagement with the work. The present unit consists of an assemblage of parts that can be arranged to hold the cutting tools such that they can approach the work from either side, said assemblage of parts including a body member, which is clamped securely to the cross-slide, and a tool-mounting plate, which is separate from the body member so that it can be mounted on either side of the body member, depending on which side of the work the tool is to be located. By making the tool-mounting plate separate from the body member, it can also be readily replaced by a similar plate adapted to hold a tool of a different size, thereby making it possible to use tools designed for use on machines of other sizes.

10 Claims, 8 Drawing Figures

PATENTED SEP 11 1973

INVENTOR.
JOSEPH A. RACCIO

BY Steward & Steward his ATTORNEYS.

TOOL-HOLDER FOR MACHINE TOOLS

BACKGROUND OF THE INVENTION

The invention relates to tool-holders, and it relates more particularly to tool-holders for forming tools for various machine tools which are provided with a cross-slide by which the tool is moved transversely of the axis of rotation of the spindle on the machine. Such machine tools include automatic screw machines, hand or engine lathes and the like.

Machine tools of this type usually are arranged with the spindle axis disposed crosswise of the machine, and each machine requires at least two tool posts or holders, one in front of the spindle axis and one in back of it. Most tool-holders, at least for circular tools, are formed from a solid block of steel which acts both as the tool-post and as the means for holding the tool. While such tool-holders are usually referred to as tool-posts, the term "tool-holder" as used herein is intended to include the tool-post as well as the actual holder for the tool. As in the case of the usual tool-post, a tool-holder of the type herein contemplated is mounted directly on the cross-slide of the machine or on a raising block that may be interposed between the base of the holder and the cross-slide in order to elevate the tool with respect to the center of the work, which of course coincides with the axis of the spindle, so that the holder can be used with the spindle running in either direction. A tool-mounting portion of the holder extends toward the spindle axis from the side of the holder that is farthest from the spindle nose, so that the tool can be moved as near as possible to the jaws of the collet without interfering with the nose of the spindle. Consequently, the tool-mounting extension of the holder must be located on one side of the tool-post for a tool in front of the spindle axis and on the opposite side of the tool-post for a tool in back of the spindle axis.

Insofar as circular tools are concerned, it has generally been felt necessary to make the tool-mounting extension of the holder integral with its tool-post or base portion, in order to prevent the tool from chattering during the cutting operation. Tool-holders for circular tools are therefore furnished in pairs, one for the front and one for the back. As a general rule, moreover, it is customary to use only those tools that are specifically designed for each size machine and the corresponding tool-holder therefor, because of the fixed relationship of the location of the mounting hole in each holder to the diameter of the circular tool to be used.

Adapters have been designed with limited success for some tool-posts, so that tools of smaller sizes than those designed specifically for a particular holder can be used, thereby making it possible to use smaller, less expensive tools on larger machines for jobs where a smaller tool can do the forming operation as well as, or perhaps even better than, a large one. The purpose of such adapters is to reduce the cost of the inventory of tools and to increase the efficiency of the larger, more expensive machines by making it practical to use them on a larger variety of jobs. Such adapters, however, are not always entirely satisfactory because they are necessarily designed to work in connection with existing holders, instead of being designed from the ground up, so to speak. Furthermore, no composite tool-holder and tool-post has been designed heretofore, which can hold circular forming tools perfectly rigid and which can also be used either in front or in back of the spindle axis.

The primary object of the present invention is to provide a tool-holder for attachment to the cross-slide of a machine, which can be used both in front and in back of the spindle axis and which will hold smaller, less expensive tools designed primarily for use on machines of smaller sizes. Another important object is to provide a tool-holder which holds the tool as rigidly and as free of chatter as the solid type of tool-holders, such as those furnished with the well-known Brown & Sharpe automatic screw machines.

SUMMARY OF THE INVENTION

The aforementioned objectives are attained in a tool-holder embodying the present invention in the provision of an assemblage of parts, which can be arranged to hold cutting tools of various sizes and diameters for either the front or back cross-slide of the machine. In order to obtain the required rigidity, a body member is provided which is designed to be mounted on the cross-slide of the machine in the same manner as the conventional tool-post, so that it can be fixed solidly on the cross-slide and yet be capable of being "squared up" with respect to the work. The opposite sides of the body member, which are parallel and extend in the direction of the cross-slide, are perfectly flat or planar and provide a large area of surface engagement with a tool-mounting plate. Both sides of the tool-mounting plate are likewise perfectly flat, so that the mounting plate can be fastened rigidly on either side of the body member in intimate surface-to-surface contact with one of its planar side surfaces. The tool-mounting plate is longer than the planar side or mounting surface on the body member, so that it projects beyond the mounting surface with which it is engaged. Means are provided for mounting the tool on the projecting portion of the mounting plate, so that the tool is rigidly positioned for engagement with the work, such means including, for example, a conventional tool-bolt, which extends through the mounting plate into threaded engagement with the tool. Since the mounting bolt for each size tool must be located at a different distance from the spindle axis, the tool can not be mounted directly on the body member, but must be supported entirely by the mounting plate. Consequently, the tool-bolt does not extend through the body member, but only through that portion of the mounting plate which projects beyond the body member. The reason for this will become more apparent from the detailed description hereinafter of one embodiment of the invention.

For purposes of obtaining absolute rigidity between the tool-mounting plate and the body member of the holder so that the tool does not chatter, it is desirable to form the body member in the shape of an inverted "T" with the mounting plate fitting against one of the shelves formed by the horizontal portion of the "T" on each side of its vertical portion. The advantage of this arrangement is that the tool-mounting plate is held between two perpendicular surfaces of the body member and becomes absolutely rigid with it when the assembly screws or bolts are tightened. It is also desirable to use a shoulder screw as one of the assembly screws and to provide a pair of aligned holes in the mounting plate and body member into which the shoulder portion of screw fits with great precision, thereby preventing any linear movement of the mounting plate on the body member.

A particularly desirable feature of the invention resides in the provision of an adjusting and locking device for circular cutting tools, which includes a gear sector pivotally mounted on a tool-bolt for fastening the tool to the projecting portion of the tool-mounting plate. The gear sector is connected with the circular tool such that for all practical purposes the sector and tool are integral with each other. A pinion gear is pivotally mounted on the tool-holder for meshing engagement with the gear sector, so that when the pinion is pivoted one way or the other, the sector and tool are pivotally adjusted about the tool-bolt. Locking means, such as a jam-nut, are provided for locking the pinion rigidly in place, and in turn locking the sector and tool in the position to which it has been adjusted. Consequently, the pinion and sector combine with the bolt-lock to prevent the tool from slipping out of adjustment on the tool-mounting plate.

The advantages of the basic design of the tool-holder of the present invention are that screw-machine shops, both large and small, can 1 substantially lower their costs for tools due to the fact that they can use smaller, less expensive tools on their larger machines where the job permits, 2 substantially reduce their inventory of tools by interchanging tools for smaller machines with those for larger machines and by using the same tool-holder on the front or back cross-slide, thereby lowering inventory costs, and 3 increase efficiency by keeping available machines in operation which would be idle if it were not for the fact that the tool-holder of the present invention is capable of holding tools designed for a machine of a different size.

DESCRIPTION OF THE PREFERRED EMBODIMENT

These and other objects and advantages of the invention will become more apparent from the following detailed description of one embodiment of the invention, which is shown in the accompanying drawings.

Figure 1:
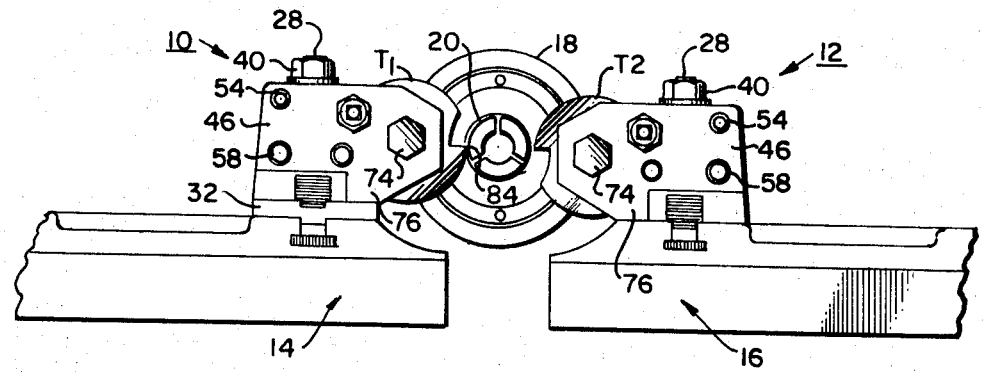
FIG. 1 is a more or less diagrammatic view in side elevation of both the front and back cross-slide of an automatic screw machine with a tool-holder of the present invention mounted on each cross-slide.

As illustrated by way of example in FIG. 1, a pair of tool-holders 10 and 12 of the present invention are provided on the front and back cross-slides 14 and 16, respectively, of a machine tool, such as an automatic screw machine. The cross-slides 14 and 16, as well as the spindle nose 18 and collet 20 of the machine are shown diagrammatically, as they are conventional and form no part of the invention.

Figure 2:
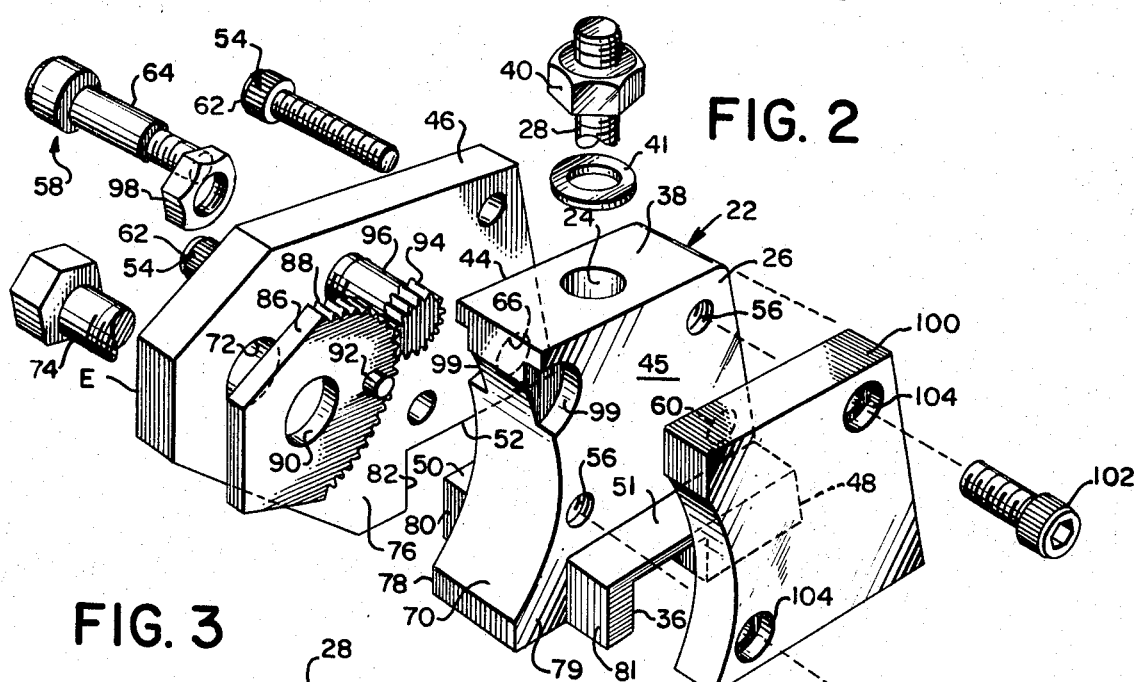
FIG. 2 is an exploded perspective view of a tool-holder embodying the present invention, parts thereof being broken away.
Figure 3:
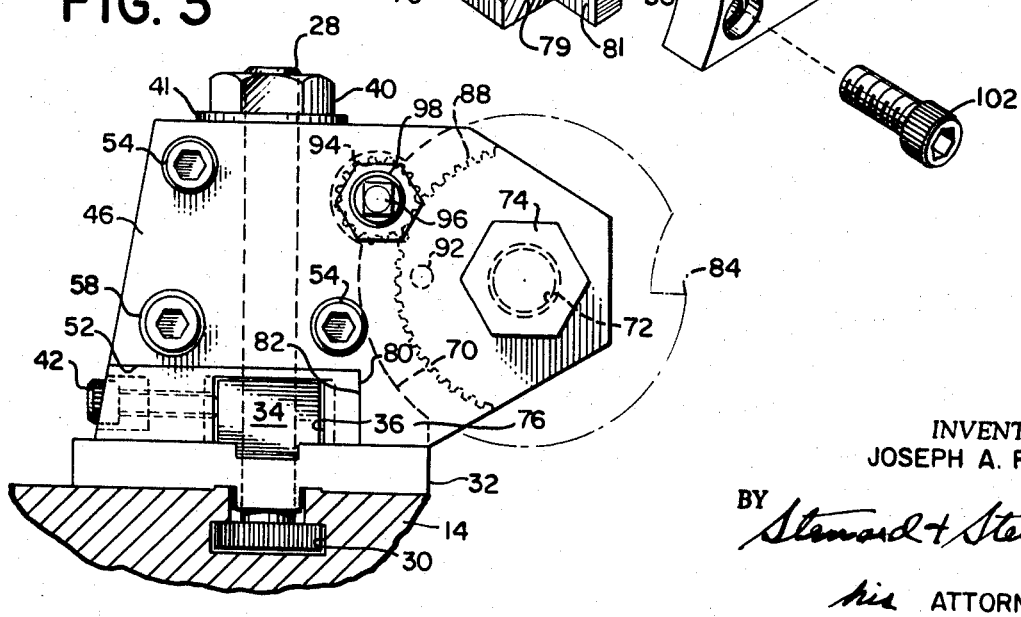
FIG. 3 is a side elevational view of the tool-holder mounted on the front cross-slide as shown in FIG. 1, but on a larger scale.

Each of tool-holders 10 and 12 is made up of an assemblage of parts shown in the exploded view of FIG. 2, which when assembled form the usual, more or less, retangular base B (FIG. 7) and extension E, upon which circular tools $T_1$ and $T_2$ are mounted. A body member 22, providing a central trunk portion of each tool-holder, is formed in an inverted T-shape (FIG. 5) from a solid block of steel. A vertical hole 24 is provided through a central portion 26 of body member 22 for a T-bolt 28 (FIGS. 2 and 3), by which the tool-holder is clamped rigidly to the cross-slide 14 in the same manner as the usual tool-post. Thus, the head of T-bolt 28 fits into a T-slot 30 in cross-slide 14 with the shank of the T-bolt extending upward through a raising block 32 (where required), a swivel block 34 in a transverse slot 36 in the bottom of body member 22 and the vertical hole 24, so that it projects above the top surface 38 of the body member 22. A nut 40 is threaded onto the projecting upper end of T-bolt 28 with a washer 41 between it and surface 38. Nut 40 is initially made only snug tight so that the tool-holder can be lined up and then adjusted angularly about T-bolt 28, in order to "square-up" the tool with the work. Such adjustment is accomplished in the usual manner by means of a pair of adjusting screws 42, 42 (FIGS. 3–6), threaded horizontally through body member 22 into engagement with the swivel block 34 (FIG. 3), keyed to raising block 32 which, in turn, is keyed within the upper portion of T-slot 30 of slide 14.

Figure 7:
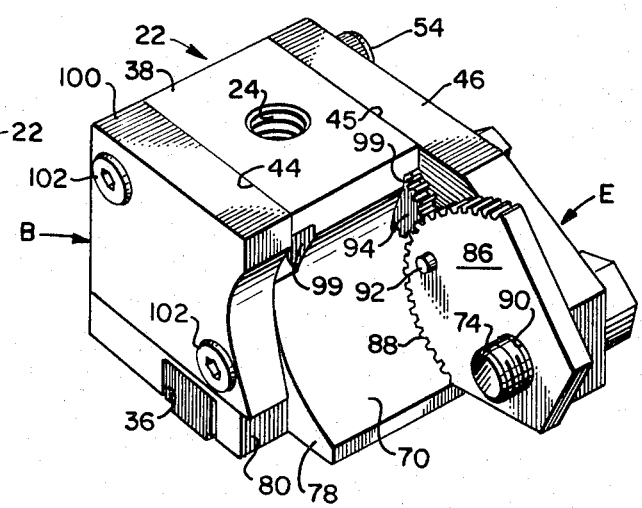
FIG. 7 is a perspective view of the tool-holder assembled for use on the back cross-slide of the machine.

Each side of the central portion 26 of body member 22 is provided with a large flat mounting surface 44, 45, to which an elongated tool-mounting plate 46 may be securely fastened. Mounting surfaces 44, 45 are disposed parallel to each other and perpendicular to the axis of rotation of the spindle of the machine when tool-holder 10 or 12 is fixed on its cross-slide 14 or 16, respectively. The horizontal cross-portion 48 (FIG. 5) of body member 22 extends laterally from, and outward of, both mounting surfaces 44 and 45 forming upwardly facing shelves 50 and 51, respectively, which are disposed perpendicular to mounting surfaces 44, 45. As may be seen in FIG. 5, when tool-mounting plate 46 is fastened to the mounting surface 44 of the body member 22, its lower edge 52 rests firmly against, and is supported by, self 50. Similarly, if tool-mounting plate 46 is assembled on the opposite side of the body member as shown in FIG. 7, so that the tool-holder can be used on the back cross-slide 16, the lower edge 52 of plate 46 engages the shelf 51.

Figure 4:
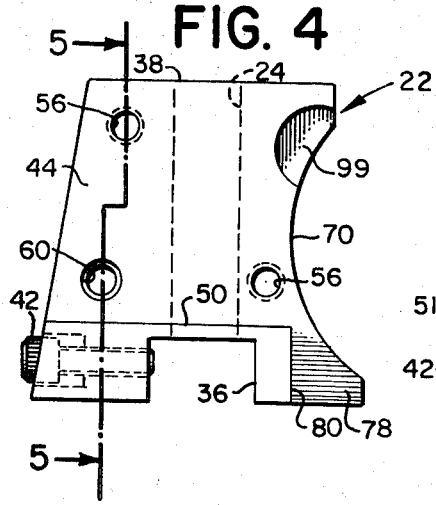
FIG. 4 is a side elevational view of the body member of the tool-holder shown in FIGS. 2 and 3.
Figure 5:
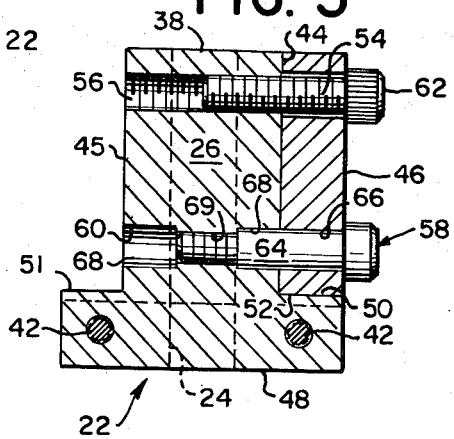
FIG. 5 is a sectional view of the body member taken on line 5—5 of FIG. 4, but with the tool-mounting plate assembled thereon.
Figure 6:
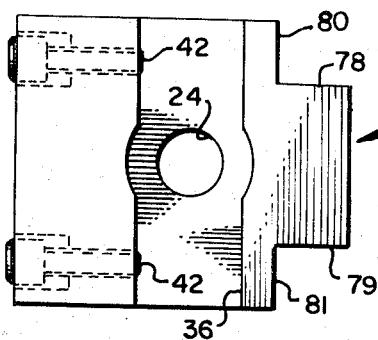
FIG. 6 is a bottom plan view of the body member.

As best seen in FIGS. 2–5, tool-mounting plate 46 is fastened to the body member 22 by three heavy assembly screws, which pass freely through tool-mounting plate 46 into threaded engagement with the body member 22. Two of the assembly screws 54, 54 are identical, and fit a pair of correspondingly threaded holes 56, 56, which extend transversely through the central portion 26 of the body member, opening at each of the mounting surfaces 44, 45 in the upper rear and lower front corners thereof. The third assembly screw 58 fits a specially formed hole 60 (FIG. 5), which is likewise disposed transversely of the body member and opens at the lower rear corner of each of surfaces 44, 45. Screws 54, 54 are desirably standard socket-head cap screws, the heads 62, 62 of which engage the outer side of plate 46, forcing it rigidly against the mounting surface 44 or 45 when turned down tight. Assembly screw 58, on the other hand, is a standard shoulder screw, having a shoulder portion 64 that is long enough to extend through an unthreaded hole 66 in the tool-mounting plate 46 and well into an unthreaded outer portion 68 of hole 60 in the body member 22 with its threaded end 69 engaging a tapped central portion of hole 60 intermediate its outer unthreaded portions 68, 68. The inside diameter of each unthreaded portion 68, 68 of hole 60 is identical with that of the hole 66 in the tool-mounting plate 46 and is only slightly greater than the O.D. of shoulder 64, so that screw 58 fits precisely within the holes 60 and 66, as illustrated in FIG. 5, thereby preventing any linear movement or "slop" between plate 46 and the mounting surface 44 or 45. Furthermore, rotational movement of plate 46 about screw 58 is positively prevented by means of the two assembly screws 54, 54, by its engagement with one of the shelves 50 or 51 on body member 22 and, as will be more apparent hereinafter, by direct engagement of a portion of plate 46 with the cross-slide of the machine. Accordingly, when assembly screws 54, 54 and 58 are turned down tight, tool-mounting plate 46 becomes for all practical purposes an integral part of body member 22, so that the tool-holder assemblage is as rigid as if it were one solid piece.

As will be noted in FIG. 4, body member 22 is provided on its inner side (to the right as viewed in FIG. 4) with a concave surface 70, which provides clearance for the circular forming tools $T_1$ and $T_2$. When the tool-mounting plate 46 is assembled on body member 22, its end portion E projects toward the work beyond the surface 70 of the body member and is provided with a hole 72 for a tool-mounting bolt 74, by which the tool $T_1$ or $T_2$ is mounted on the side of the plate 46 facing spindle nose 18.

In order to provide as much support for the tool as possible, the tool-mounting plate 46 has a depending abutment portion 76 on the underside of projecting portion E. The depending abutment portion 76 extends downward into solid surface-to-surface engagement with the cross-slide of the machine or with the raising block 32, depending on the direction in which the spindle is rotated. As viewed in FIG. 1, the tools $T_1$ and $T_2$ are mounted for counterclockwise rotation of the spindle. The depending abutment portion 76 of the tool holder 10 accordingly rests solidly against the top of the raising block 32, while in the tool-holder 12 it rests directly on the back cross-slide 16.

It will be noted that the horizontal cross-portion 48 of body member 22 is cut back a short distance at both sides of the concave surface 70 in order to form a lateral engagement surface 78 or 79 on each side of body member 22 at the lower inner corner thereof, and to form end surfaces 80, 81 which are each perpendicular to both the surfaces 78, 79 and the upwardly facing surfaces of shelves 50, 51. When mounting plate 46 is assembled on the body member 22, the rearwardly facing surface 82 on its depending abutment portion 76 contacts one of the end surfaces 80, 81, providing additional support for the mounting plate against movement relative to body member 22. In addition, greater lateral contact between mounting plate 46 and body member 22 is provided by the lateral engagement surface 78 or 79. Such increased contact of course increases the friction between the parts when the assembly screws are turned down tight, thereby helping to make the mounting plate 46 virtually solid with the body member 22. Thus, regardless of which direction the forces are exerted between mounting plate 46 and body member 22 by the cutting action of the tool, a great abundance of surface-to-surface contact is provided, longitudinally as well as laterally of the tool-holder, in order to ensure that the tool-mounting plate 46 does not move in the slightest with respect to the body member 22 or to the cross-slide of the machine, to which the tool-holder is clamped.

Various means may be provided for adjusting the position of the cutting edge 84 (FIG. 8) of tool $T_1$ or $T_2$ rotationally about its mounting bolt 74. In this instance, it has been found desirable to employ an adjusting device which will rotate the tool accurately for adjustment purposes, while also preventing it from rotating during use, thereby holding it in adjustment. To this end, a sector 86 of a gear is provided between the tool-mounting plate 46 and tool $T_1$ or $T_2$. The shape of gear sector 86 on its sides opposite its teeth 88 is generally the same as the end portion of tool-mounting plate 46, so that it does not extend too far beyond the confines of plate 46 to interfere with any part of the machine, even when adjusted to either of its limits. Sector 86 has a hole 90 at its center of rotation, through which the mounting bolt 74 fits, and a dowel pin 92 is provided midway between the ends of its toothed portion 88. The tools $T_1$ and $T_2$ are provided with corresponding pin holes (not shown) into which dowel pin 92 fits, so that any rotation of sector 86 is transmitted to the tool.

A small adjusting gear or pinion 94, which meshes with gear sector 86, is fixed on a shaft 96 pivotally mounted in tool-mounting plate 46, with the end of shaft 96 projecting beyond the outer side of plate 46. The projecting end of shaft 96 is square so that pinion 94 can be pivoted by means of a wrench in order to pivot both the sector 86 and tool $T_1$ or $T_2$ in unison. When the cutting edge 84 of the tool is adjusted to the desired position, a jam-nut 98 (FIGS. 2 and 3) on a threaded portion of shaft 96 is turned down tight against the outer side of mounting plate 46 fixing pinion 94 against further rotation. Tool-mounting bolt 74, which fits freely through the mounting hole 72 in plate 46 and is threaded into the cutting tool $T_1$ or $T_2$ in the usual manner, is then tightened, such that between the bolt 74 and sector 86 the tool is locked in position against the forces exerted on it during the cutting operation on the work. It will also be noted that when bolt 74 is brought up tight, gear sector 86 is bound securely between the mounting plate and the cutting tool.

Since it is desirable to have a gear ratio between pinion 94 and sector 86 of more than 3 to 1, the adjusting pinion 94 is in this instance located adjacent the concave surface 70 of body member 22, necessitating the provision of semi-circular cut-outs 99, 99 for pinion 94 in the sides 44 and 45 of the vertical portion 26 of the body member. The pinion 94 is thus partially housed within one of the cut-outs 99, 99 in the assembly as clearly shown in FIG. 7.

As shown in FIGS. 2 and 7, a cover plate 100 is provided for the side of body member 22 opposite that on which tool-mounting plate 46 is assembled. Cover plate 100 is held in position by a second pair of cap screws 102, 102, which fit through holes 104, 104 therein into the opposite ends of threaded holes 56, 56 in body member 22 from the mounting screws 54, 54 for tool-mounting plate 46. The purpose of cover plate 100 is to protect the unused mounting surface 44 or 45 and to prevent chips and other foreign matter from entering the holes 56, 56 and 60 on the side of body member 22 that is not occupied by the tool-mounting plate 46. In order to ensure that the tool can be positioned as close as possible to the collet 20, it is desirable to countersink holes 104, 104 on both sides of cover plate 100, so that when cap screws 102, 102 are tight their heads are nearly flush with the exposed surface of the cover plate and therefore do not interfere with any portion of the machine such as the spindle nose 18.

It will be readily apparent from the foregoing description that both the front and rear tool-holders 10 and 12 shown in FIG. 1 are identical, except that the tool-mounting plate 46 in the rear tool-holder is assembled on the opposite side of the body member 22 as illustrated in FIG. 7. Consequently, a screw machine shop need only stock one spare tool-holder for each size machine instead of two, because the tool-holder of the present invention can be used either for the front or for the back simply by assembling the tool-mounting plate on one side or the other of body member 22.

Figure 8:
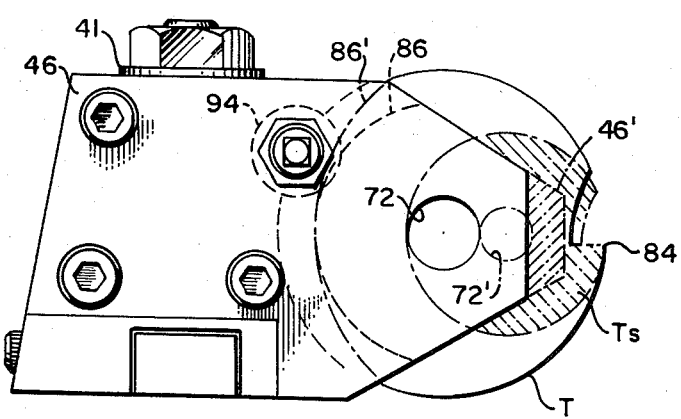
FIG. 8 is a side elevational view similar to FIG. 3, but showing the tool-holder assembly only, and illustrating how smaller tools can be used on the same holder.

Another and equally important feature of the present tool is that the tool-mounting plate 46 can be removed and replaced with one designed to hold tools which are intended for use on smaller size machines. FIG. 8 shows the tool-holder of the present invention with the tool-mounting plate 46 for a large machine, for example, a No. 2 size automatic screw machine, the tool T for such a machine being shown in full lines. In order to use a smaller (e.g. No. 00) size tool Ts, shown shaded and in broken lines, which is made for the No. 00 size screw machine, it is a simple matter to replace the tool-mounting plate 46 for the No. 2 size tool with a slightly longer one, indicated by shading and in broken lines at 46' and having a tool-bolt hole 72' of the proper size to accept a No. 00 size tool-bolt. Tool-bolt hole 72' is positioned such that the cutting edge of tool Ts is located at the same point with respect to the cross-slide of the machine as the cutting edge 84 of the larger tool. For some tool sizes, such as an intermediate No. 0 size on a No. 2 size tool-holder, the tool-mounting plate 46 does not need to be longer because the tool-bolt hole can be located nearer the end of the same size mounting plate without weakening it. In each instance, however, the hole for the tool-bolt must be the correct size for the particular tool to be used because these tool sizes are standard.

Due to the fact that the tool-bolt hole 72' (FIG. 8) is located further from adjusting pinion 94, a separate gear sector 86' must be provided with the tool-mounting plate 46' for the smaller tool Ts. Sector 86' is similar in all respects to the sector 86 for the larger tool except that it has a longer radius and its hole 90 for the tool-bolt is smaller to correspond with the hole 72' of the tool-mounting plate 46'. In other words, for each tool size, separate tool-mounting plates and gear sectors must be provided in matched pairs. It will also be noted that in order to provide clearance for the large tools, the concave surface 70 on body member 22 must have a radius which is slightly greater than the radius of the largest size tool to be used.

What is claimed is:

1. In a tool-holder for circular cutting tools for machines, such as engine lathes and screw machines, which are provided with a cross-slide for moving the cutting tool along a path transversely of the axis of rotation of the spindle of such machine tool, the combination comprising a body member having provision for rigid attachment to such cross-slide for movement toward and away from said spindle axis, a planar mounting surface on one side of said body member disposed substantially perpendicular to said spindle axis, another planar mounting surface on the opposite side of said body member parallel with said first mounting surface, an elongated tool-mounting plate having parallel engagement surfaces along a portion of its sides, said plate being attachable to said body member with one of its said engagement surfaces in intimate surface-to-surface contact with one of said mounting surfaces of said body member depending on which side of said spindle axis the tool is to be located, said mounting plate having a projecting portion extending beyond said one mounting surface and said body member in the direction of said spindle axis, means for rigidly fastening said tool-mounting plate to said body member in such surface-to-surface contact therewith, and bolt means for mounting a cutting tool on said tool-mounting plate, said bolt means extending through only said cutting tool and said projecting portion of said tool-mounting plate beyond said body member.

2. In a tool-holder for machine tools, such as engine lathes and screw machines which are provided with a cross-slide for moving the cutting tool along a path transversely of the axis of rotation of the spindle of such machine tool, the combination comprising a body member having provision for rigid attachment to such cross-slide for movement toward and away from said spindle axis, a planar mounting surface on one side of said body member disposed substantially perpendicular to said spindle axis, another planar mounting surface on the opposite side of said body member parallel with said first mounting surface, said body member being T-shaped in cross-section on a plane perpendicular to said planar mounting surfaces, said mounting surfaces being disposed on opposite sides of the central portion of the "T," with the cross portion of the "T" forming a shelf adjacent each of said mounting surfaces, an elongated tool-mounting plate having parallel engagement surfaces along a portion of its sides, said plate being attachable to said body member with one of its said engagement surfaces in intimate surface-to-surface contact with one of said mounting surfaces on said body member depending on which side of said spindle axis the tool is to be located, said tool-mounting plate being disposed such that a portion of its edge engages said shelf on the side of said body member on which said plate is mounted, said mounting plate having a projecting portion extending beyond said one mounting surface in the direction of said spindle axis, means for rigidly fastening said tool-mounting plate to said body member in such surface-to-surface contact therewith, and means for mounting a cutting tool on said projecting portion of said tool-mounting plate.

3. The combination defined in claim 2, wherein said tool-mounting plate is provided with a positioning surface extending perpendicular to its said edge-portion and said body member is provided with a mating surface perpendicular to said shelf and disposed for surface-to-surface engagement with said positioning surface on said tool-mounting plate.

4. The combination defined in claim 3, wherein said body member is mounted such that the "T" is inverted, at least part of the lower edge of said tool-mounting plate comprising said edge-portion, said tool-mounting plate having a depending section adjacent one end of its lower edge and forming said positioning surface, said cross portion of said body member being formed to interlock with said depending section and forming said mating surface.

5. The combination defined in claim 4, wherein the under edge of said depending section of said tool-mounting plate is disposed for engagement with a member rigid with the cross-slide of the machine.

6. The combination defined in claim 5, wherein said tool-mounting plate and body member are provided with pairs of aligned holes extending perpendicular to said mounting surfaces and wherein said means for fastening said tool-mounting plate comprises a plurality of assembly screws each extending through one of said holes in said tool-mounting plate into the corresponding aligned hole in said body member, at least one of said assembly screws comprising a shoulder screw having an elongated shoulder portion, the said aligned pair of holes for said shoulder screw having an inside diameter providing a precision fit with said shoulder portion of said shoulder screw.

7. The combination defined in claim 6, wherein the side of said body member which is located between said mounting surfaces and, beyond which said tool-mounting plate extends, is concave in order to provide clearance for a circular tool, and which further includes a cover plate removably mountable on the other mounting surface of said body member and means for securing said cover plate thereto, one edge of said cover plate being concave and coinciding with the concave side of said body member when said cover plate is secured thereto.

8. In a tool-holder for circular cutting tools, the combination defined in claim 1, wherein said means for mounting said circular tool on said tool-mounting plate comprises, a tool-bolt extending through the projecting portion of said tool-mounting plate perpendicular to its said engagement surfaces and into said circular tool longitudinally thereof and having means for forcing said circular tool and tool-mounting plate together when said tool-bolt is rotated in one direction, together with a gear sector pivotally mounted on said tool-bolt and connected with said circular tool such that pivotal movement of said gear sector about said tool-bolt is transmitted to said circular tool, a pinion gear pivotally mounted on said tool-holder for meshing engagement with said gear sector, means for pivoting said pinion gear in order to pivot said gear sector and circular tool in unison when said tool-bolt is loosened, and means for rigidly locking said pinion gear against movement such that said circular tool is fixed in its adjusted position on said tool-mounting plate by the combined effect of tightening said tool-bolt and locking said pinion gear.

9. In a tool-holder for circular cutting tools comprising a tool-mounting portion and a tool-bolt for fastening a circular tool to said tool-mounting portion, said tool-bolt extending through said tool-mounting portion of said tool-holder and into said circular tool longitudinally thereof and having means for forcing said circular tool and tool-mounting portion together when said tool-bolt is rotated in one direction, the combination comprising a gear sector pivotally mounted on said tool-bolt and connected with said circular tool such that pivotal movement of said gear sector is transmitted to said circular tool, a pinion gear pivotally mounted on said tool-holder for meshing engagement with said gear sector, means for pivoting said pinion gear in order to pivot said gear sector and circular tool in unison when said tool-bolt is loosened, and means for rigidly locking said pinion gear against movement such that said circular tool is fixed in its adjusted position on said tool-holder by the combined effect of tightening said tool-bolt and locking said pinion gear.

10. The combination defined in claim 9, wherein said gear sector is disposed between said tool-mounting portion of said tool-holder and said circular tool such that when said tool-bolt is tightened said gear sector is bound rigidly between said circular tool and said tool-mounting portion.

* * * * *